(12) United States Patent  
Dohmann et al.

(10) Patent No.: US 9,937,517 B2
(45) Date of Patent: Apr. 10, 2018

(54) DEVICE FOR GUIDING AND/OR FORMING AN EXTRUDED STRAND OF PLASTIC AND PROCESS FOR COATING A FLAT MATERIAL

(71) Applicant: battenfeld-cincinnati Germany GmbH, Bad Oeynhausen (DE)

(72) Inventors: Heinrich Dohmann, Hoexter (DE); Thomas Gesper, Guetersloh (DE)

(73) Assignee: BATTENFELD-CINCINNATI GERMANY GMBH, Bad Oeynhausen (DE)

( * ) Notice: Subject to any disclaimer, the term of this patent is extended or adjusted under 35 U.S.C. 154(b) by 566 days.

(21) Appl. No.: 13/866,261

(22) Filed: Apr. 19, 2013

(65) Prior Publication Data

US 2013/0236648 A1 Sep. 12, 2013

Related U.S. Application Data

(63) Continuation of application No. PCT/EP2011/067205, filed on Oct. 1, 2011.

(30) Foreign Application Priority Data

Oct. 25, 2010 (DE) .................. 10 2010 042 862

(51) Int. Cl.  
*B05C 9/12* (2006.01)  
*B29C 47/00* (2006.01)  
(Continued)

(52) U.S. Cl.  
CPC ............ *B05C 9/12* (2013.01); *B29C 47/0014* (2013.01); *B29C 47/0019* (2013.01); *B29C 47/0021* (2013.01); *B29C 47/0023* (2013.01); *B29C 47/903* (2013.01); *B29C 47/907* (2013.01); *B29C 47/92* (2013.01); *B29C 47/34* (2013.01); *B29C 2947/92571* (2013.01); *B29C 2947/92619* (2013.01); *B29C 2947/92904* (2013.01); *B29C 2947/92923* (2013.01); *B29C 2947/92933* (2013.01)

(58) Field of Classification Search  
CPC .......... B05D 1/26; B05D 1/265; B29C 47/90; B29C 47/92; B29C 47/34; B29C 47/901; B29C 47/907; F16L 11/00; F16L 11/04; F16L 11/042; F16L 11/081; F16L 11/088  
USPC ......................................... 118/102; 427/356  
See application file for complete search history.

(56) References Cited

U.S. PATENT DOCUMENTS 3,990,921 A * 11/1976 Sekmakas et al. ........... 148/255  
6,179,347 B1 * 1/2001 Dole et al. ................... 285/321  
2002/0160072 A1 10/2002 Pontarolo

FOREIGN PATENT DOCUMENTS

DE 1175421 B 8/1964  
DE 3830277 A1 3/1990  
(Continued)

*Primary Examiner* — Alexander M Weddle  
(74) *Attorney, Agent, or Firm* — Leydig, Voit & Mayer, Ltd.

(57) ABSTRACT

A device for guiding and/or forming a plastics profile includes a region of alterable cross-section formed by a wound flat element. The wound flat element overlaps in a region and is in close mutual contact in the overlapping region. The wound flat element includes a flexible and resiliently deformable coating thereon. A device is provided for altering the region of alterable cross-section.

5 Claims, 6 Drawing Sheets

(51) Int. Cl.
*B29C 47/90* (2006.01)
*B29C 47/92* (2006.01)
*B29C 47/34* (2006.01)

(56) References Cited

FOREIGN PATENT DOCUMENTS

| | | | |
|---|---|---|---|
| DE | 102004052972 | A1 | 5/2006 |
| DE | 2007026309 | B3 | 11/2008 |
| DE | 102007026309 | B3 | 11/2008 |
| EP | 1254757 | A1 * | 11/2002 |
| EP | 1652651 | A2 * | 5/2006 |
| GB | 880391 | A | 10/1961 |
| WO | WO 2010105598 | A2 | 9/2010 |

* cited by examiner

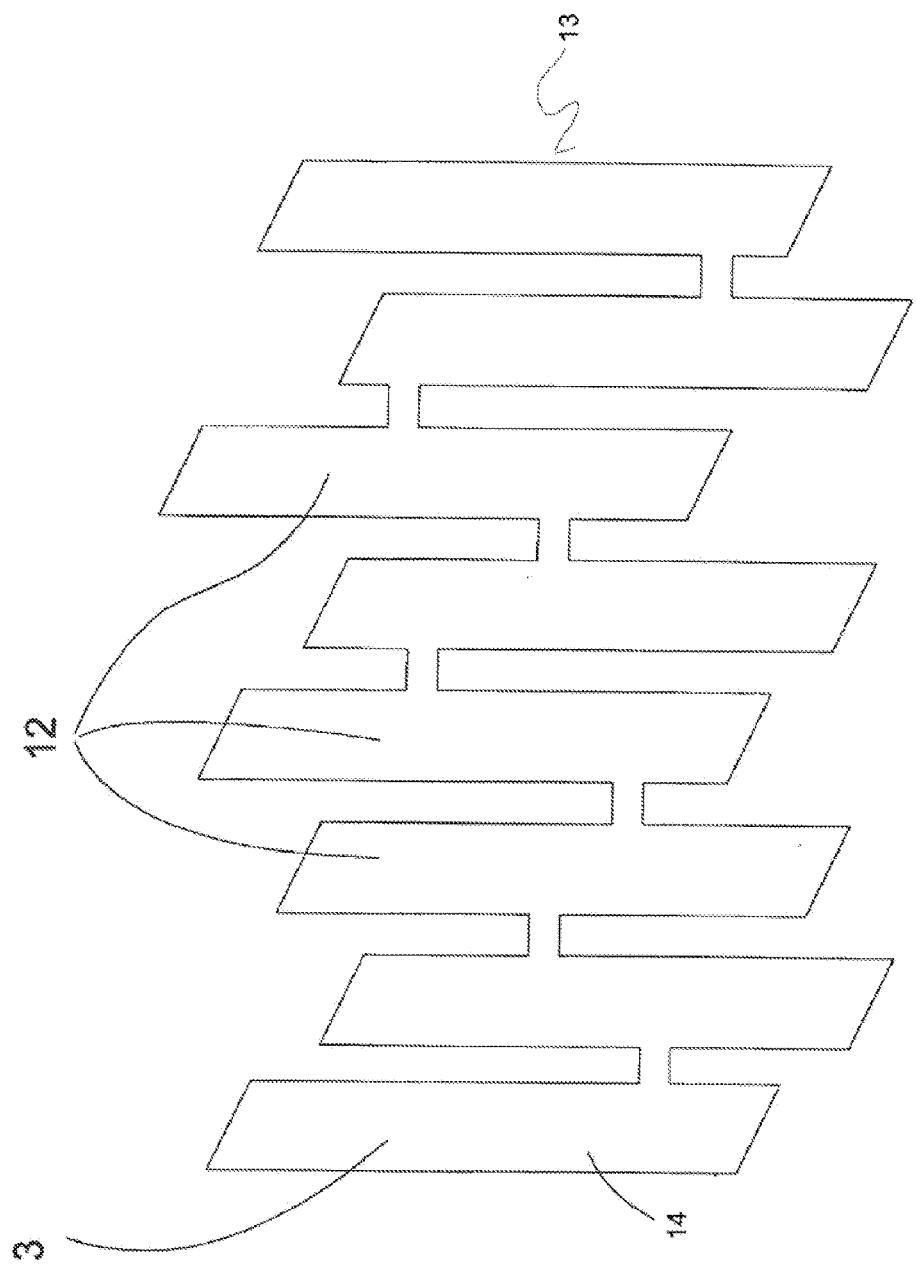

DEVICE FOR GUIDING AND/OR FORMING AN EXTRUDED STRAND OF PLASTIC AND PROCESS FOR COATING A FLAT MATERIAL

CROSS REFERENCE TO RELATED APPLICATIONS

This application is a continuation of International Application No. PCT/EP2011/067205, filed on Oct. 1, 2011, and claims benefit to German Patent Application No. DE 10 2010 042 862.0, filed on Oct. 25, 2010, each of which is incorporated by reference herein in its entirety.

FIELD

The invention relates to a device for guiding and/or forming a plastics rod and/or a plastics profile, preferably a plastics pipe, which device comprises a region of alterable cross-section and means for altering the region of alterable cross-section, wherein the region of alterable cross-section is formed from a wound flat material or a plurality of plies of one or various materials, wherein the wound flat material or the plurality of plies of one or various materials overlaps in portions and is in close mutual contact in the overlapping region.

Furthermore, the invention includes a method for coating the device.

BACKGROUND

DE 10 2004 052 972 A1 discloses a wound flat material used in calibrating extruded plastics pipes. The flat material overlaps in portions and is in close mutual contact in the overlap region. DE 10 2007 026 309 discloses a similar device, also in the case of which portions are in close superposition. The larger the overlap surfaces and the larger the contact surfaces of the flat material to the plastics pipe, the greater the friction which occurs.

SUMMARY

In an embodiment, the present invention provides a device for guiding and/or forming a plastics profile includes a region of alterable cross-section formed by a wound flat element. The wound flat element overlaps in a region and is in close mutual contact in the overlapping region. The wound flat element includes a flexible and resiliently deformable coating thereon. A device is provided for altering the region of alterable cross-section.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 7 shows an alternative embodiment of the alterable cross-section.

DETAILED DESCRIPTION

In an embodiment, the present invention proposes a system in which the friction which occurs is minimised.

The solution to the problem addressed by the device is facilitated in that the flat material is provided with a flexible and resiliently deformable coating layer.

This coating reduces the coefficient of friction of the contacting surfaces. This layer is particular in that it is resilient and thus is able to change without difficulty together with the radius during the cross-sectional alteration.

The solution to the problem addressed by the method is facilitated in that the coating is applied in a temperature range below the tempering temperature of the flat material.

This method makes it possible for good adhesion to be achieved and for the good anti-friction properties to be maintained, since the coating material is not damaged by elevated temperatures.

Figure 1:
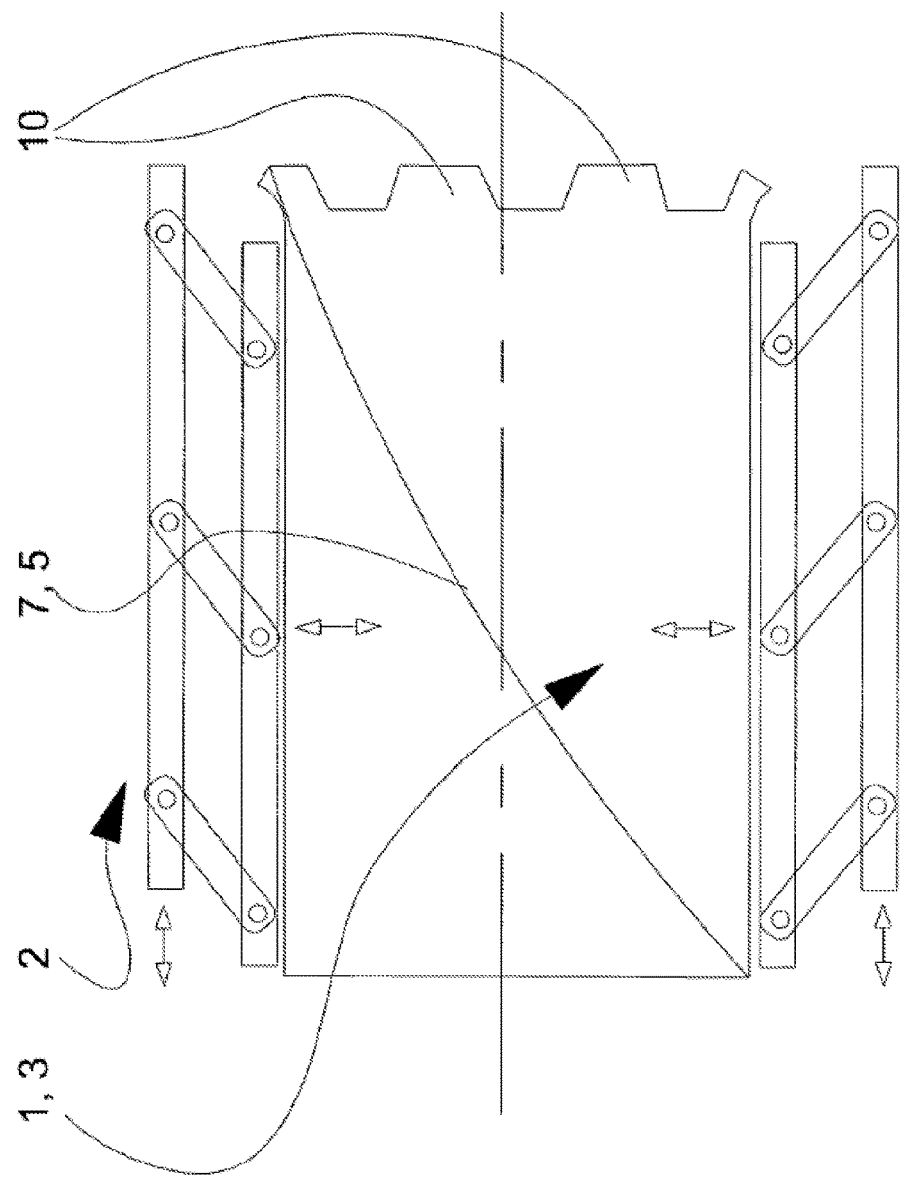
FIG. 1 shows a wound sheet having a means for altering the alterable cross-section.

FIG. 1 schematically shows an embodiment of the invention in use in a calibration apparatus. The device shows a region of alterable cross-section 1 and constructed as a wound flat material 3. Means 2 for altering the region of alterable cross-section 1 are arranged around this region. In this embodiment, said means are displaceable rod elements. It can clearly be seen in this cross-sectional view that the inner end 7 of the flat material 3 has an oblique gradient 5 which extends in a helix about the extrusion axis such that spider lines are obliterated and are thus as invisible as possible. By displacing the rod elements as the means for altering the region of alterable cross-section 1 with respect to one another (illustrated by the corresponding double-headed arrows), the flat material 3 is wound more or less tightly (likewise shown by the double-headed arrows) and the cross-section widens or narrows. To simplify guidance of the plastics rod, tabs 10 are arranged on an end face of the flat material 3.

Figure 2:
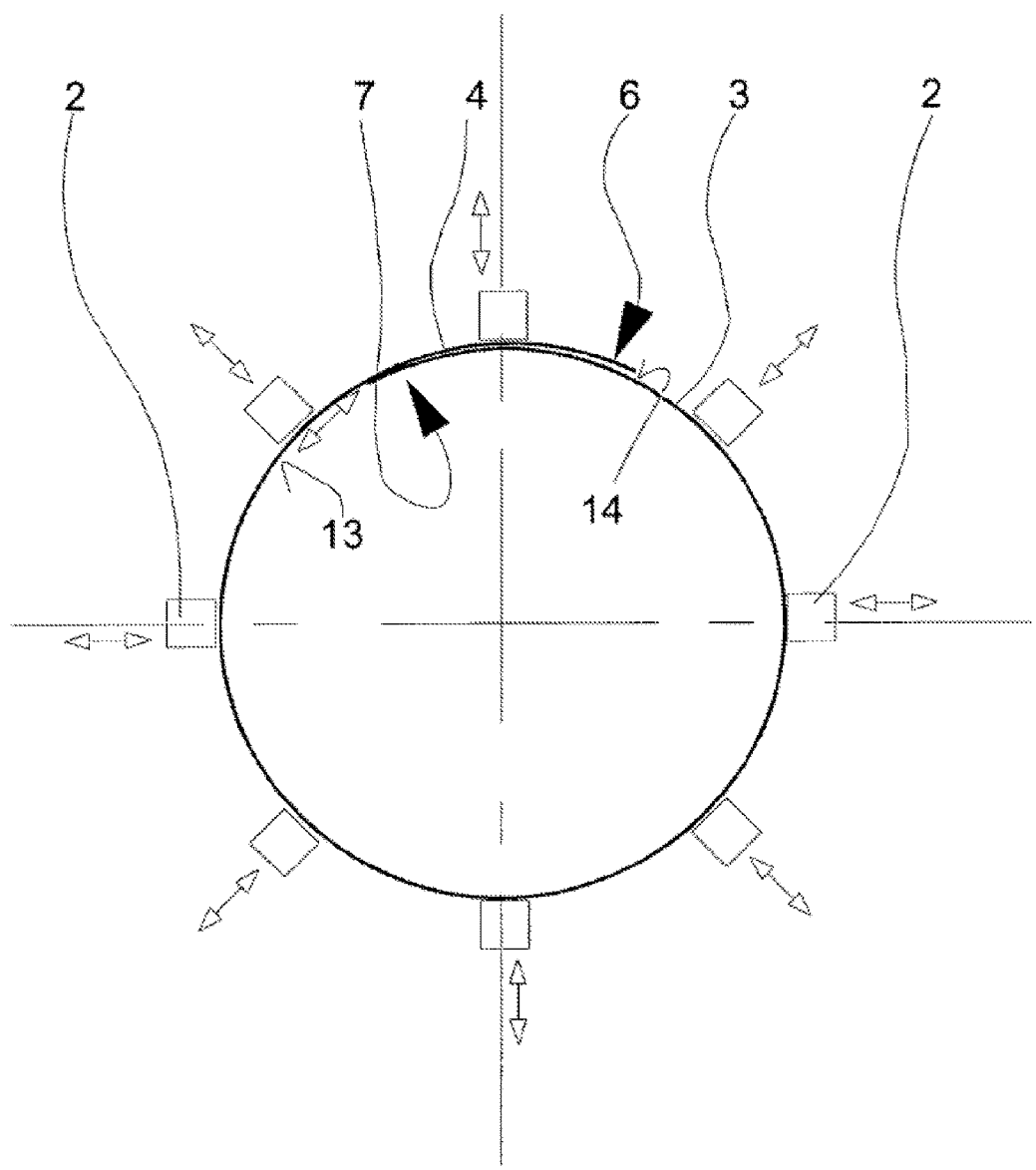
FIG. 2 is a side view of FIG. 1.
Figure 3:
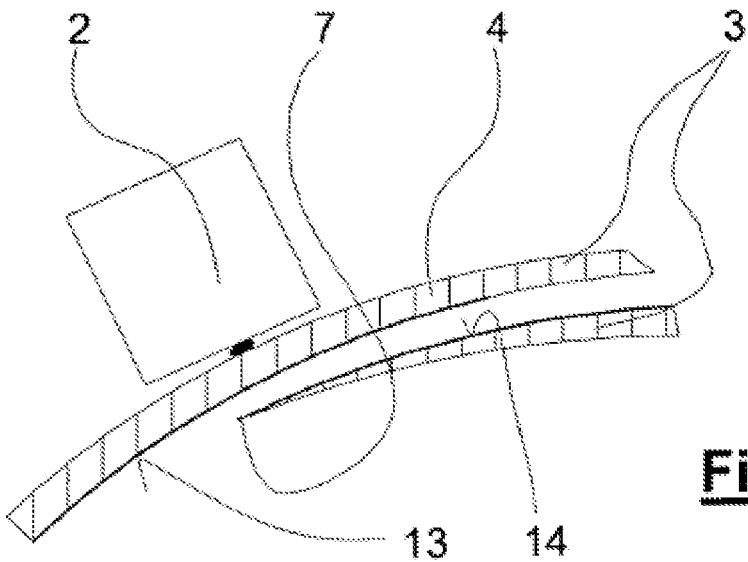
FIG. 3 shows an enlarged portion from FIG. 1.

FIG. 2 is a side view of FIG. 1 and illustrates the alteration means 2 arranged around the region of alterable cross-section 1. Here, too, it can be seen that that the flat material 3 overlaps in portions 4. It can be seen in the detail in FIG. 3 that the outer end 6 of the flat material 3 is connected to the means 2 for altering the region of alterable cross-section 1. The inner end 7 tapers continuously over the material thickness thereof, thereby creating a transition of maximum uniformity.

In this figure the coating is also illustrated using a thicker line. The flat material 3 has the coating 14 on the outer face thereof and the coating 13, which is in this case applied to only part of the overlap region, on the inner face thereof. Of course, the coating may also extend over the entire flat material 3.

Figure 4:
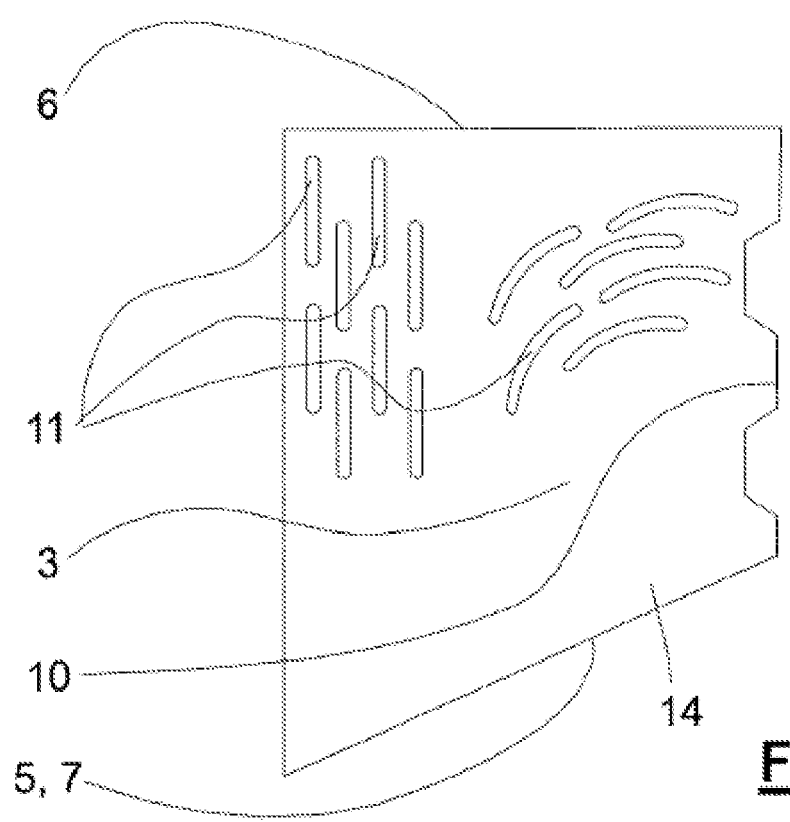
FIG. 4 shows the alterable cross-section in the unwound state.

FIG. 4 shows the flat material 3 in the unwound state. The oblique gradient 5 of the inner region 7 is again visible, as are the tabs 10 arranged on one face. The perforations 11 to be introduced have been indicated and are in this case constructed as either slots or are sickle-shaped having an alterable angle with respect to the extrusion axis.

Figure 5:
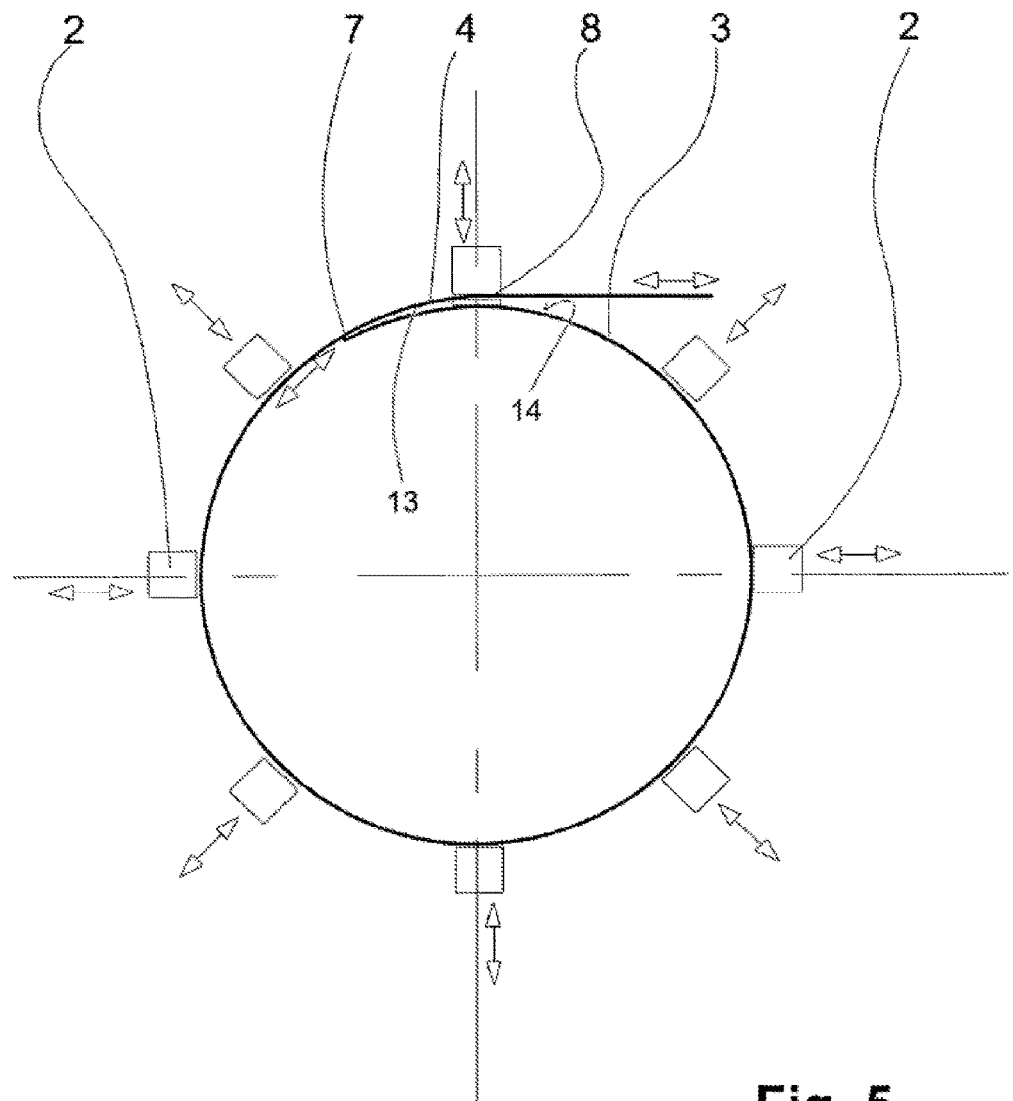
FIG. 5 shows an alternative embodiment.

The embodiment according to FIG. 5 basically corresponds to FIG. 2, but differs therefrom in that the flat material 3 in FIG. 5 is guided through a clearance 8 in the means 2 for altering the alterable cross-section 1. This carries the advantage of rendering it possible to keep the overlapping region 4 as small as possible, depending on the application.

Figure 6:
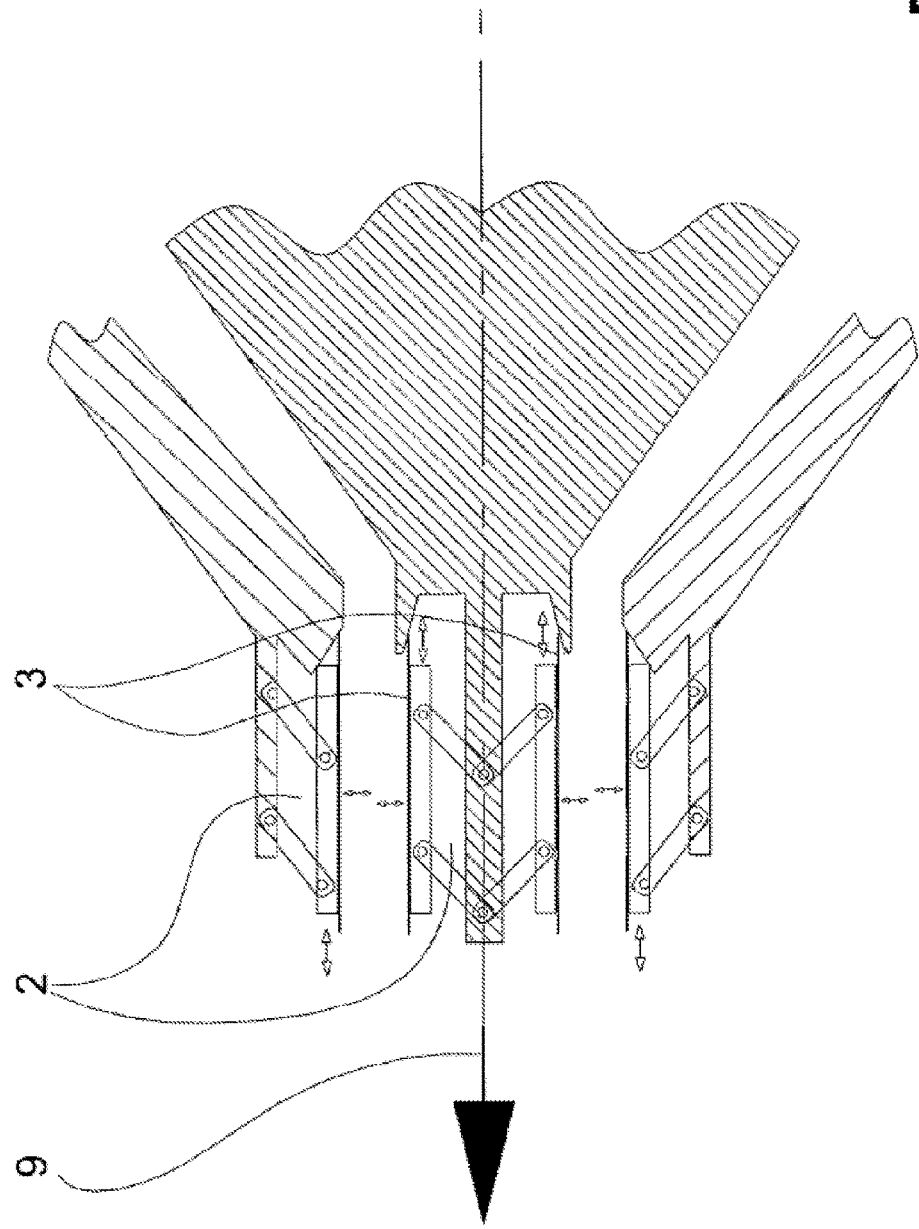
FIG. 6 shows an alternative embodiment for use as part of a casing head.

FIG. 6 shows a further example in which the device according to the invention is shown as part of a casing head. A first wound flat material forms an inner cross-section for the mandrel of the casing head and a second wound flat material forms an outer cross-section for the sleeve of the casing head. The flat material overlaps in portions, the adjustment takes place uniformly via the means 2 arranged on both the inner cross-section and the outer cross-section. The various double-headed arrows are also intended to illustrate the direction of movement of the rods or the alteration of the cross-section. When arranging the means 2 for the outer cross-section, care should be taken to ensure that the flat material projects in the region of the casing head. If the end of the casing head is configured correspondingly, this projecting length forms an outward seal with respect to the melt.

As an alternative to the embodiment of the flat material 3 according to FIG. 4, in which embodiment perforations have been introduced for the generation of the vacuum, the flat material 3 can be constructed in the form of a plurality of interconnected strips 12, as shown in FIG. 7. This embodiment of the flat material 3 can likewise be wound, it likewise being possible for an oblique gradient 5 to be produced by means of suitable selection of the locations of the webs fitted between the strips 12 and the position, associated therewith, of the inner end 7 of the flat material 3. Each individual strip 12 then has an overlapping region 4.

LIST OF REFERENCE NUMERALS 1 alterable cross-section
2 means for altering 1
3 flat material
4 overlapping region of 3
5 oblique gradient
6 outer region of 3
7 inner end of 3
8 clearance
9 extrusion direction
10 tabs
11 perforation
12 strips for forming 3
13 coating on the inner face of 3
14 coating on the outer face of 3

The invention claimed is:

1. A device for at least one of guiding and forming a plastic pipe, the device comprising:
    a region of alterable cross-section formed by a wound flat element, the wound flat element overlapping in a region and being in close mutual contact in the overlapping region, the wound flat element including a flexible and resiliently deformable coating layer thereon that reduces friction in the overlapping region, wherein the coating layer has a hardness exceeding 1500 Vickers; and
    a device for altering the region of alterable cross-section.

2. The device recited in claim 1, wherein the wound flat element includes a plurality of plies of one or more materials.

3. The device recited in claim 1, wherein the coating adheres to the flat element.

4. The device recited in claim 1, wherein the coating is at least one of chemically insulating or corrosion inhibiting.

5. A method for coating a flat element, the method comprising:
    providing a flat element for forming a plastic pipe, the flat element forming a region of alterable cross-section by overlapping in a region and being in close mutual contact in the overlapping region; and
    applying a flexible and resiliently deformable coating layer on the flat element in a temperature range below a tempering temperature of the flat element so as to reduce friction in the overlapping region, wherein the coating layer has a hardness exceeding 1500 Vickers.

* * * * *